(12) United States Patent
Skillicorn et al.

(10) Patent No.: US 6,276,806 B1
(45) Date of Patent: Aug. 21, 2001

(54) MICRO-ETALON AND ASSOCIATED METHODS

(76) Inventors: Lionel John Skillicorn, 4 Hedgerow Close, Braddan, Isle of Man, IM2 1MH (GB); Ronald Leopold John Cowell, 67 Port e Chee Avenue, Douglas, Isle of Man, 1M2 5EU (GB); Warren Louis Gutheil; James Martin Schwarz, Jr., both of 1760 Grand Ave., Merrick, NY (US) 11566

(*) Notice: Subject to any disclaimer, the term of this patent is extended or adjusted under 35 U.S.C. 154(b) by 0 days.

(21) Appl. No.: 09/379,719

(22) Filed: Aug. 24, 1999

(51) Int. Cl.$^7$ ........................................ G02B 5/08
(52) U.S. Cl. ..................... 359/855; 359/857; 359/900; 83/39; 83/56
(58) Field of Search ..................... 359/850, 851, 359/855, 857, 871, 900; 372/99; 83/39, 56

(56) References Cited

U.S. PATENT DOCUMENTS

| 3,580,082 | * | 5/1971 | Strack .............................. 359/847 |
| 4,196,402 | * | 4/1980 | Butler et al. . |
| 4,813,756 |   | 3/1989 | Frenkel et al. . |
| 5,646,762 |   | 7/1997 | Delavaux et al. . |
| 6,128,134 | * | 10/2000 | Feldman et al. . |
| 6,181,726 | * | 1/2001 | Lunt . |

* cited by examiner

Primary Examiner—Ricky D. Shafer
(74) Attorney, Agent, or Firm—Jones Volentine, P.L.L.C.

(57) ABSTRACT

A micro-etalon having non-beveled outer edges may be mass-produced without suffering from expected breakage problems. Such a configuration allows etalons to be mass-produced, i.e., on a wafer level. The mass-production preferably includes aligning spacer block strips to be diced with two reflective surfaces to form the etalon.

10 Claims, 2 Drawing Sheets

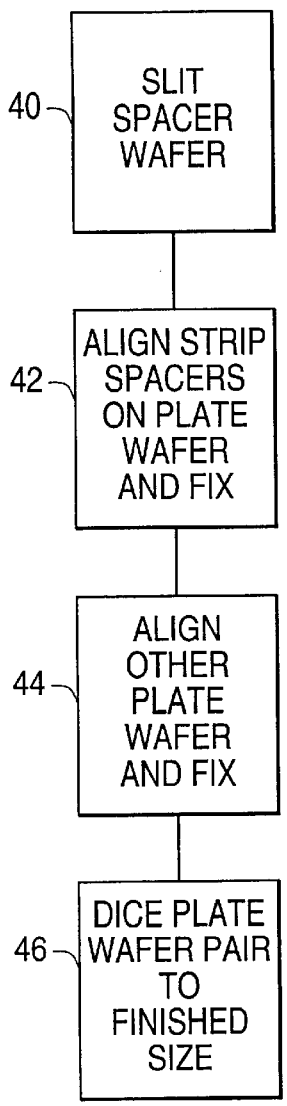
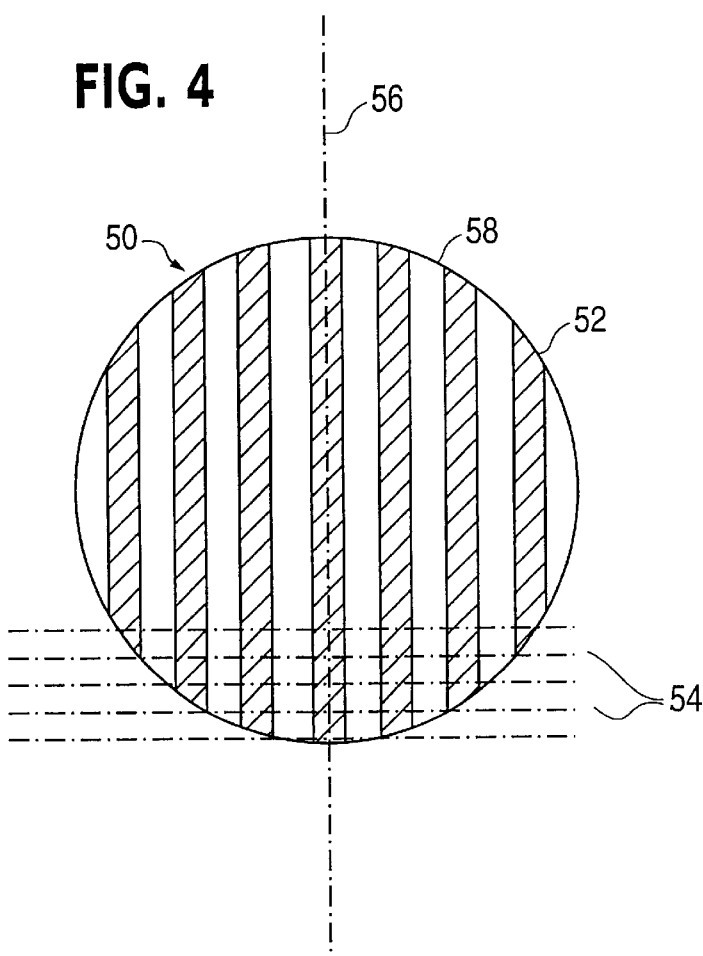

MICRO-ETALON AND ASSOCIATED METHODS

BACKGROUND OF THE INVENTION

1. Field of the Invention

The present invention is directed to etalons, such as Fabry-Perot etalons, and associated methods, more particularly to straight-edged etalons and methods of mass-producing etalons.

2. Description of Related Art

An example of a conventional rectangular etalon 10 is shown in FIGS. 1A and 1B. The etalon 10 includes two plane, parallel, highly reflective surfaces 12 on plates 14. The surfaces 12 are separated by spacer blocks 16, forming a gap 19 there between. The gap 19 can be an air-filled gap, a gas-filled gap, or a vacuum.

As can be seen therein, edges 18 of all components of the etalon 10 are beveled. This beveling is used to insure durability of the etalon while it is being integrated into a system, particularly for preventing chips on the etalon. However, this beveling does not lend itself to mass production of etalons.

Conventionally, etalons have been larger than on a micro scale and a large number of etalons were not required for a system. However, the use of etalons in communications systems, particularly with wavelength division multiplexed systems, has become more widespread. The use of etalons in communication systems is taught, for example, in U.S. Pat. No. 4,813,756 entitled "Etalon Filters for Optical Channel Selection in Wavelength Division Multiplexed Fiber Systems" and U.S. Pat. No. 5,646,762 entitled "Optical Communication System Using Tandem Fabry-Perot Etalon for Wavelength Selection," both of which are herein incorporated by reference in their entirety.

Such applications require both small etalons and a large number of etalons. The beveling of the conventional etalons makes both the small size and the mass production of such etalons impractical.

SUMMARY OF THE INVENTION

The present invention is therefore directed to a micro-etalon and a method of mass producing such micro-etalons which substantially overcome one or more of the problems due to the limitations and disadvantages of the related art.

It is an object of the present invention to create a micro-etalon which may be mass-produced.

These and other objects may be realized by providing an etalon including a first plate having a first reflective surface, a second plate having a second reflective surface, said second reflective surface facing said first reflective surface, and spacer blocks between the first and second reflective surfaces which separate the first and second reflective surfaces, outer edges of the first plate, the second plate and the spacer blocks being non-beveled.

The outer edges may all be straight. All dimensions of the etalon may be under 10 mm. The first plate, the second plate and the spacer blocks may all have been cut from wafers. The cross-sections of the etalon may be rectangular. The outer edges of the spacer blocks may be aligned with outer edges of the plates.

It is a further object of the present invention to provide a method of mass-producing micro-etalons.

These and other objects may be realized by providing a method of producing a plurality of etalons including slitting a spacer substrate into spacer strips, aligning spacer strips on a first plate substrate having a first reflective surface facing the spacer strips, aligning a second plate substrate to the first plate substrate with the spacer strips aligned thereon, the second plate substrate having a second reflective surface facing the spacer strips, and dicing aligned first plate substrate, spacer strips, and second plate substrate to form the plurality of etalons.

Before dicing to form the plurality of etalons, spacer strips may be fixed to the first and second wafer substrates. The spacer substrate, the first plate substrate and the second plate substrate may all have the same surface dimensions prior to slitting and dicing. The aligning of the spacer strips to the first plate substrate may include aligning the slit spacer substrate strips to the first plate substrate, having removed undesired spacer strips. The substrates may be wafers of any shape.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which:

FIG. 3 is a flow chart for a method of creating etalons in accordance with the present invention; and FIG. 4 is an illustration of the spacer strips placed upon a substrate in accordance with the present invention.

DETAILED DESCRIPTION OF THE PREFERRED EMBODIMENTS

Figure 1A:
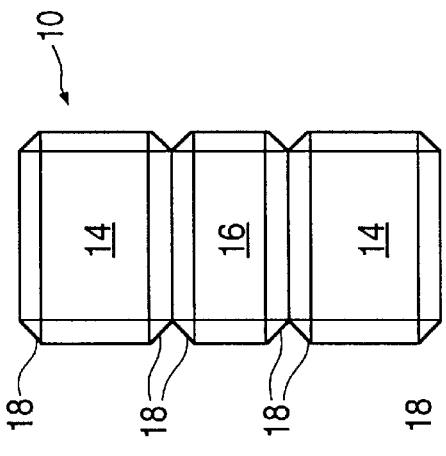
FIG. 1A is a front view of a conventional rectangular etalon.
Figure 1B:
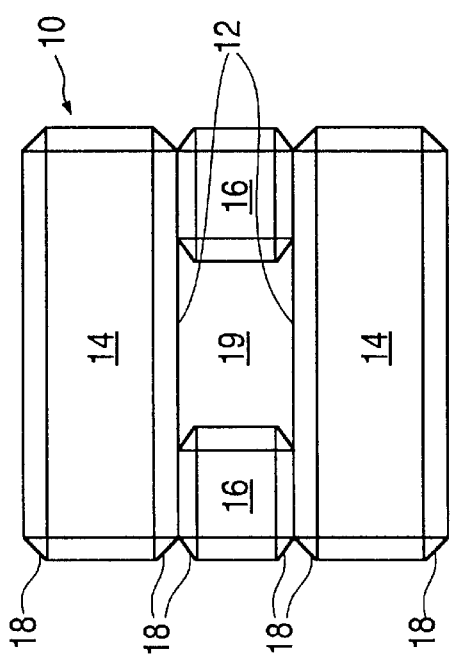
FIG. 1B is a side view of the conventional rectangular etalon of FIG. 1A.
Figure 2B:
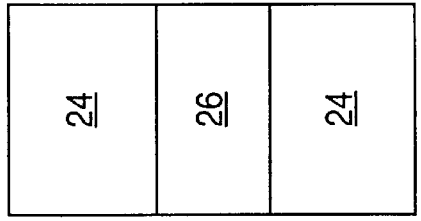
FIG. 2B is a side view of the etalon of the present invention of FIG. 2A.
Figure 2C:
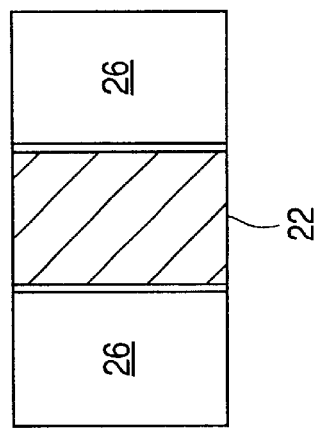
FIG. 2C is a sectional view taken along the lines I—I of FIG. 2A.
Figure 2A:
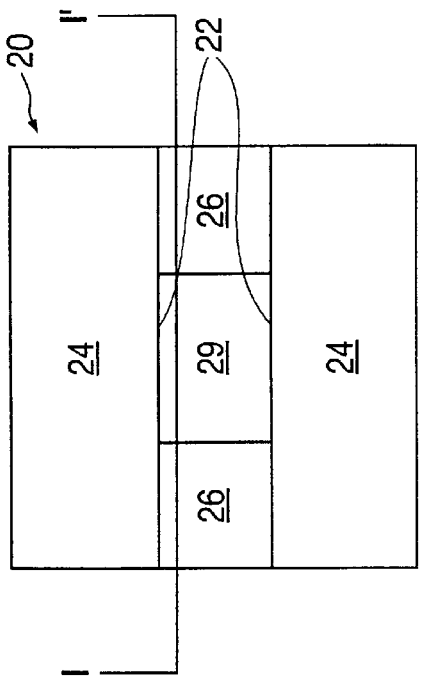
FIG. 2A is a front view of an etalon in accordance with the present invention.

FIGS. 2A–2C illustrate an etalon 20 in accordance with the present invention. The etalon 20 includes a pair of plane, parallel, reflecting surfaces 22 on plates 24 separated by spacer blocks 26. A gap 29 between the reflecting surfaces 22 formed by the spacer blocks 26 can be filled with air, gas, or be evacuated. The view of FIG. 2C, taken along lines I—I of FIG. 2A more clearly illustrates the reflecting surface 22 which is typically coated with materials having the desired reflection properties.

Thus, the etalon 20 has non-beveled edges on all exterior surfaces, while having spacer blocks 26 on outside edges thereof for mechanical stability. Preferably, all the edges are straight and all cross-sections of the etalons are rectangular. Preferably, the spacer blocks 26 are made of low expansion glass for thermal stability. Spacer block size is minimized to offer maximum aperture while retaining mechanical rigidity.

In contrast to the etalon 10, the etalon 20 in accordance with the present invention has straight edges, i.e., outer edges which are not beveled. In creating the smaller etalons required for recent applications, e.g., telecommunications, the present invention exploits the fact that etalons below a certain size, e.g., on the order of 10 mm×10 mm×10 mm or less, are no longer subject to the same mechanical problems which required the beveled edges of the previous etalons. Additionally, elimination of the beveling allows even further reduction of the size of the etalons. Finally, the elimination of the bevels allows the etalons to be mass-produced, as discussed below.

FIG. 3 is a flow chart illustrating a method of mass-producing etalons in accordance with the present invention. As long as bevels were believed to be required, such mass-production was impractical, as there was no way to bevel the edges of the etalon in a mass fashion.

In step 40, a wafer or substrate of material to be used as the spacer blocks is slit into long strips. In step 42, these strips are aligned and fixed to a wafer or substrate of material, including the reflective surface, to serve as one of the plates. These strips are spaced apart by a desired width of the gap 29. For ease of alignment, preferably the spacer wafer is the same surface size as the plate wafer, i.e., the thickness may vary, but the outside dimensions are the same. Then, the appropriate spacer strips may be fixed to the plate.

In step 44, another plate wafer or substrate is aligned and fixed on top of the plate wafer with the attached spacer strips, and with the second wafer's reflecting surface facing the plate wafer with the attached spacer strips. In step 46, the resultant structure is diced, thereby creating the straight-edged micro-etalon.

FIG. 4 illustrates a top view of a circular plate wafer 50 with a reflective surface 58 on a top surface thereof and with spacer strips 52 placed on the top surface spaced by a desired air gap width. The dashed lines 54 indicate an example of horizontal dicing lines and dashed lines 56 indicate an example of vertical dicing lines set in accordance with a desired size of the etalon 20. The plate wafer pair with the spacer strips interposed there between will be diced along these lines to form an etalon 20 of the desired size. While the substrates in FIG. 4 are illustrated as circular wafers, substrates of other shapes, such as rectangles, may be employed. Conventional processing equipment is better able to handle the conventional circular wafer.

Thus, the etalon in accordance with the present invention has non-beveled outer edges, while having intra cavity spacer blocks adjacent to the outside edges thereof for mechanical stability. Preferably, all the edges are straight and all cross-sections of the etalons are rectangular. Such etalons may be mass-produced using wafers and dicing.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation. Thus, the scope of the invention should be determined by the appended claims and their legal equivalents, rather than by the examples given.

What is claimed is:

1. A method of producing a plurality of etalons comprising:

slitting a spacer substrate into spacer strips;

aligning the spacer strips on a first plate substrate having a first reflective surface facing the spacer strips;

aligning a second plate substrate to said first plate substrate with the spacer strips aligned thereon, said second plate substrate having a second reflective surface facing the spacer strips; and dicing the aligned first plate substrate, spacer strips, and second plate substrate to form the plurality of etalons.

2. The method according to claim 1, further comprising, prior to said dicing to form the plurality of etalons, fixing said spacer strips to said first and second plate substrates.

3. The method according to claim 1, wherein said spacer substrate, said first plate substrate and said second plate substrate have the same surface dimensions prior to slitting and dicing.

4. The method according to claim 1, wherein the aligning of the spacer strips to the first plate substrate includes the alignment of the slit spacer substrate strips to the first plate substrate, having removed undesired spacer strips.

5. The method according to claim 1, wherein the substrates are wafers of any shape.

6. The method according to claim 1, wherein said dicing produces an etalon for which outer edges of at least one of a first plate, second plate and spacer are non-beveled.

7. The method according to claim 6, wherein the outer edges are straight.

8. The method according to claim 1, wherein said dicing produces an etalon having a maximum dimension being less than 10 mm.

9. The method according to claim 1, wherein said dicing produces an etalon having all cross-sections thereof being rectangular.

10. The etalon according to claim 1, wherein said aligning of the spacer strips and said aligning of the second plate result in etalons having outer edges of spacers aligned with outer edges of the first and second plates.

\* \* \* \* \*